(12) United States Patent
Barkley et al.

(10) Patent No.: US 7,543,065 B2
(45) Date of Patent: Jun. 2, 2009

(54) METHOD AND SYSTEM FOR REDUCING THE NUMBER OF PORTS ALLOCATED BY A RELAY

(75) Inventors: Warren Vincent Barkley, Mill Creek, WA (US); Paul D. Tidwell, Sammamish, WA (US); Timothy M. Moore, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1044 days.

(21) Appl. No.: 11/081,807

(22) Filed: Mar. 15, 2005

(65) Prior Publication Data

US 2006/0212576 A1   Sep. 21, 2006

(51) Int. Cl.
*G06F 15/16* (2006.01)
(52) U.S. Cl. .............. 709/227; 709/203; 709/226; 709/238; 709/245
(58) Field of Classification Search .......... 709/203, 709/226, 227, 238, 245
See application file for complete search history.

(56) References Cited

U.S. PATENT DOCUMENTS

| | | | | |
|---|---|---|---|---|
| 5,764,915 | A * | 6/1998 | Heimsoth et al. ........... 709/227 |
| 7,142,532 | B2 * | 11/2006 | Penfield et al. ............. 370/352 |
| 7,453,852 | B2 * | 11/2008 | Buddhikot et al. .......... 370/331 |
| 2004/0028035 | A1 * | 2/2004 | Read ......................... 370/352 |
| 2004/0139228 | A1 * | 7/2004 | Takeda et al. ............... 709/245 |
| 2005/0060426 | A1 * | 3/2005 | Samuels et al. ............. 709/238 |
| 2006/0212576 | A1 * | 9/2006 | Barkley et al. .............. 709/226 |

OTHER PUBLICATIONS

Jeffay, Kevin, The Multimedia Transport Protocol RTP, COMP 249 Advanced Distributed Systems, Sep. 28, 1999.
Tyson, Jeff, "How Network Address Translation Works," How Stuff Works, Copyright 1998-2005, Accessed Feb. 3, 2005 http://computer.howstuffworks.com/nat.htm/printable.
Egevang, K., The IP Network Address Translator (NAT), Network Working Group, Request for Comments 1631, May 1994.
European Patent Application No. 06111100.1-2413, Microsoft Corporation, Apr. 18, 2006.
Rosenberg, J., Traversal Using Relay NAT (TURN), Copyright The Internet Society, 2003.

* cited by examiner

*Primary Examiner*—Michael Won
(74) *Attorney, Agent, or Firm*—Perkins Coie LLP (57) ABSTRACT

A method and system for reducing the number of ports allocated by a relay server is provided. A connection system uses a bidirectional technique to establish a connection via the relay server between two endpoints (e.g., client computers) that can be used bidirectionally to send a stream from a first endpoint to a second endpoint and a stream from the second endpoint to the first endpoint. The connection system may also use a stream multiplexing technique to further reduce the number of ports allocated by a relay server by multiplexing multiple streams onto a single connection. The connection system may also use an endpoint multiplexing technique to reduce the number of ports allocated by a relay server by multiplexing streams from different endpoints through a single connection via the relay server.

16 Claims, 10 Drawing Sheets

METHOD AND SYSTEM FOR REDUCING THE NUMBER OF PORTS ALLOCATED BY A RELAY

TECHNICAL FIELD

The described technology relates generally to providing connectivity through network address translators that block communications that use certain protocols.

BACKGROUND

Many networks connect to other networks, such as the Internet, through a network address translator ("NAT"). A NAT maps Internet protocol ("IP") addresses used by an internal network to IP addresses used by an external network, and vice versa. NATs were originally developed to overcome the 32-bit limitation of the IP addresses. An internal network may have thousands of computers that need access to an external network. If each computer (e.g., PDA and cell phone) in the world had its own IP address, then more than 32 bits may be needed to uniquely address all computers. An internal network may use a NAT to provide a single external IP address to the external networks and may provide an internal IP address for each computer of the internal network. All external computers would communicate with the internal network via the external IP address of the internal network. When an internal computer sends a communication via the NAT to an external computer, the NAT allocates an external port for that internal computer and maintains a mapping between an external port and internal computer. The NAT then forwards the communication to the destination external computer system from that external port. When the NAT receives a response to the communication on that external port, the NAT uses the mapping to identify the internal computer and then forwards the response to the internal computer.

A NAT is typically implemented as part of a firewall or other device that limits incoming communications from the external network that use suspect protocols. In particular, communications from the external network using these suspect protocols that are not a response to a communication initiated from the internal network are blocked by the NAT. The suspect protocols typically include TCP and UDP. One problem occurs when both the computers have their own NATs that block such communications. Since the NAT blocks non-responding communications, all communications sent by either computer will be blocked by the NAT. Thus, communication between an internal computer and the external computer using the suspect protocols is not possible when both have NATs that block non-responding communications that use the suspect protocols.

One solution that has been proposed for overcoming the limitations of a NAT is the Traversal Using Relay NAT ("TURN") protocol as specified by Internet Engineering Task Force RFC 2026. The TURN protocol provides a means by which an internal computer can obtain a transport address (e.g., IP address and port) through which it can receive communications from any computer which can send packets to the public Internet. The TURN protocol accomplishes this by relaying communications via a relay server that is accessible via the public Internet.

Figure 1:
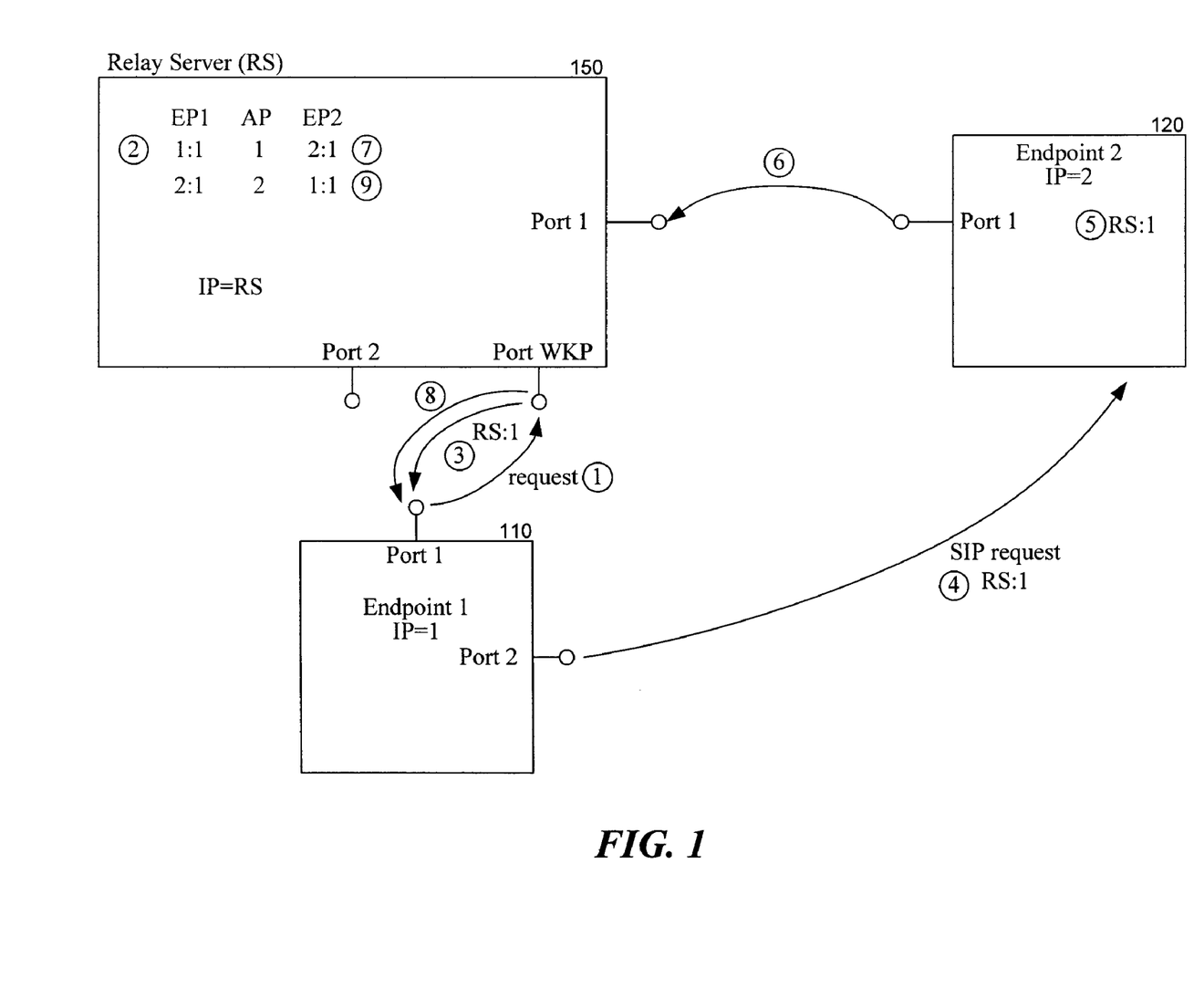
FIG. 1 is a block diagram that illustrates the TURN protocol.

FIG. 1 is a block diagram that illustrates the TURN protocol. In this example, client computer 110 communicates with client computer 120 via relay server 150. Client computer 110 has IP address 1 and is behind a NAT (not shown), and client computer 120 has IP address 2 and is also behind a NAT (not shown). To establish a connection with client computer 120 using a suspect protocol, client computer 110 first sends (1) from its port 1 to a well-known port ("WKP") of the relay server a request to allocate a port. The relay server allocates port 1 and creates (2) a mapping between the transport address of the requesting client (i.e., IP address 1 and port 1) to the allocated port (i.e., port 2). The relay server then sends (3) the allocated port number to client computer 110. Upon receiving the allocated port number, client computer 110 forwards (4) the IP address of the relay server and the allocated port number to client computer 120 using a protocol through which client computer 120 can receive communications. For example, client computer 120 may be able to receive communications using the Session Initiation Protocol ("SIP"). When client computer 120 receives the allocated port number, it creates (5) a mapping between client computer 110 and the IP address of the relay server and the allocated port 1. Client computer 120 then sends (6) a communication to port 1 of the relay server. Upon receiving the communication, the relay server updates (7) its mapping to map the transport address (i.e., IP address 2 and port 1) of client computer 120 to the allocated port 1. The relay server then forwards (8) the communication to IP address 1 and port 1 as indicated by the mapping. Client computer 120 may similarly establish a connection with client computer 110 in an analogous manner. The relay server may allocate port 2 to the connection and create (9) a mapping from allocated port 2 that indicates that communications received on allocated port 2 are to be forwarded to client computer 120 (i.e., IP address 2 and port 1). Client computer 110 will then send communications to client computer 120 via port 2 of the relay server, and client computer 120 will then send communications to client computer 110 via port 1 of the relay server. Thus, two connections are established between each client pair of computers, and each connection is used unidirectionally.

Figure 2:
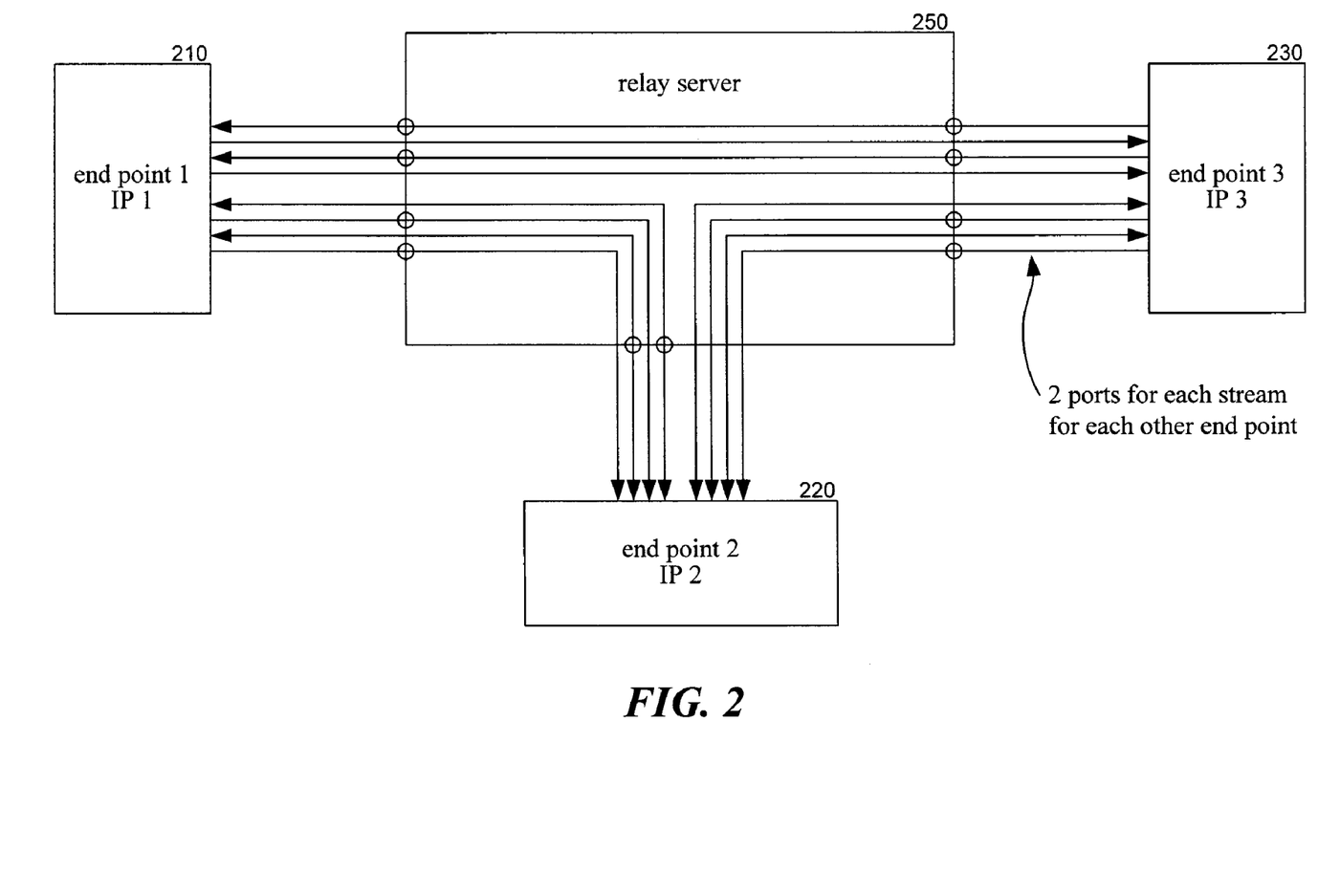
FIG. 2 illustrates the allocation of ports for a three-party conference.

A difficulty with the use of a TURN relay server is that many ports need to be allocated by the relay server. In the example of FIG. 1, a port was allocated so that client computer 110 could send communications to client computer 120, and another port was allocated so that client computer 120 could send communications to client computer 110. Thus, the relay server allocates two ports and creates two unidirectional connections for each pair of computers. If the client computers need to send multiple streams (e.g., video and audio), then the relay server would allocate two ports and thus two connections for each stream. Thus, the relay server would allocate four ports for a two-stream conference between a pair of client computers. Moreover, if a conference includes more than two client computers, then a connection for each stream would need to be established between a client computer and each other client computer. For example, if three client computers are to conduct a multimedia conference of audio and video, then each client computer would establish two connections with each other client computer via the relay server. To establish these connections, the relay server allocates four ports for each client computer system for a total of 12 allocated ports. FIG. 2 illustrates the allocation of ports for a three-party conference. Client computers 210, 220, and 230 have established connections through relay server 250. The circles illustrate the allocated ports. The relay server maintains a mapping between each allocated port and the source and destination endpoints (e.g., computer systems) that are connected via that port. The number of allocated ports would be doubled when a separate connection is needed for controlling information of each media stream. Thus, when a conference involves two media streams and three participants, the relay server would allocate 24 ports.

The risk of an attack of a computer system increases as the number of allocated ports increases. Also, the data storage requirements and processing requirements increase as the number of allocated ports increases. It would be desirable to have a technique for reducing the number of ports that a relay server needs to allocate for a multiparty conference.

SUMMARY

A method and system for reducing the number of ports allocated by a relay server is provided. A connection system uses a bidirectional technique to establish a connection via the relay server between two endpoints (e.g., client computers) that can be used bidirectionally to send a stream from a first endpoint to a second endpoint and a stream from the second endpoint to the first endpoint. The connection system may also use a stream multiplexing technique to further reduce the number of ports allocated by a relay server by multiplexing multiple streams onto a single connection. The connection system may also use an endpoint multiplexing technique to reduce the number of ports allocated by a relay server by multiplexing streams from different endpoints through a single connection via the relay server. The connection system may also use various combinations of these techniques to provide further reductions in the number of allocated ports.

DETAILED DESCRIPTION

A method and system for reducing the number of ports allocated by a relay server is provided. In one embodiment, a connection system uses a bidirectional technique to establish a connection via the relay server between two endpoints (e.g., client computers) that can be used bidirectionally to send a stream from a first endpoint to a second endpoint and a stream from the second endpoint to the first endpoint. Because the connection system establishes only one bidirectional connection, the relay server only allocates one port for the pair of streams, which reduces the number of ports that need to be allocated by up to 50%. To establish a bidirectional connection, a first endpoint requests the relay server to allocate a port. The first endpoint may send a request to a well-known port of the relay server. Upon receiving the request, the relay server allocates a port and creates a mapping between the allocated port and the first endpoint. The relay server then sends the allocated port number to the first endpoint. The first endpoint sends the allocated port number to a second endpoint with which it is to communicate. The first endpoint may send the allocated port number using a protocol that can traverse a NAT, such as the Session Initiation Protocol ("SIP"). When the second endpoint receives the allocated port number, it sends a communication to the allocated port of the relay server. Upon receiving a communication from the second endpoint on the allocated port, the relay server creates a mapping between the allocated port and the second endpoint. Thus, the relay server creates a mapping between both the first endpoint and the second endpoint and the allocated port. The connection system, however, prevents a second port from being allocated by the relay server when the second endpoint requests its allocation. The connection system may prevent the allocation in various ways. For example, the connection system may interpose a firewall between the well-known port of the relay server and the second endpoint. When the second endpoint sends a request to allocate a port to the well-known port of the relay server, the firewall blocks the request, which prevents the relay server from allocating a port. When the first endpoint is to communicate with the second endpoint, the first endpoint identifies ports through which it may be able to communicate with the second endpoint. In this case, the first endpoint has received a communication from the second endpoint via the well-known port of the relay server, so it may be able to communicate with the second endpoint via the well-known port. Since the relay server did not receive the allocate request from the second endpoint, it did not allocate a port and the first endpoint cannot communicate with the second endpoint via an allocated port of the relay server. The first endpoint then attempts to send a communication via an identified port. In this case, the first endpoint attempts to send the communication to the second endpoint via the well-known port of the relay server. When the relay server receives the communication, it uses the port of the first endpoint to retrieve the port number of the second endpoint based on the mapping to the allocated port. The relay server then forwards the communication to the port of the second endpoint. In this way, the relay server allocates a single port that can be used bidirectionally.

In one embodiment, the connection system uses a stream multiplexing technique to further reduce the number of ports allocated by a relay server by multiplexing multiple streams onto a single connection. For example, when a first endpoint wants to send video and audio streams to a second endpoint, the first endpoint may establish a unidirectional or bidirectional connection with the second endpoint via the relay server. The first endpoint can then multiplex the video and audio streams onto the connection. The relay server forwards the communications (e.g., packets) of the stream that it receives via the connection to the second endpoint. Each communication of a stream may include a unique identifier of that stream such as a synchronization source ("SSRC") identifier of the Real-Time Protocol ("RTP"). When the second endpoint receives the communications of the multiplexed streams, it can use the unique identifier to de-multiplex the streams and forward the de-multiplexed communications as appropriate. In this way, the relay server need only allocate for each endpoint one port for every other endpoint in the conference. For example, in a three-way conference the relay server would allocate six ports (i.e., two ports for each endpoint), and in a four-way conference the relay server would allocate 12 ports (i.e., three ports for each endpoint). If the stream multiplexing technique is used in conjunction with the bidirectional technique, then the relay server need only allocate one port for each pair of endpoints (i.e., three ports in the case of a three-way conference and six ports in the case of a four-way conference).

In one embodiment, the connection system uses an endpoint multiplexing technique to reduce the number of ports allocated by a relay server by multiplexing streams from different endpoints of a conference through a single connection via the relay server. The connection system provides a multiplexing device, such as a multipoint control unit ("MCU"), that multiplexes and de-multiplexes streams of multiple endpoints to and from the relay server. The multiplexing device may receive a request from a local endpoint to establish a conference with multiple local endpoints and multiple remote endpoints. The multiplexing device then requests the relay server to allocate one port for each remote endpoint and notifies each remote endpoint of its allocated port. Each remote endpoint sends its communications to its allocated port, which are forwarded by the relay server to the multiplexing device. When a communication is received from a remote endpoint on its allocated port, the relay server uses its mappings to identify a port of the multiplexing device. The relay server then forwards the communication to the multiplexing device. The multiplexing device maintains a mapping between SSRC identifiers and local endpoints. The multiplexing device can use the SSRC identifier of a communication to identify the destination local endpoint and then forwards the communication to that local endpoint. When a local endpoint sends a communication to one of the multiple remote endpoints, the multiplexing device forwards the communication to the relay server. The relay server identifies the destination endpoint based on its mapping and forwards the communication to that endpoint. The multiplexing device may provide the multiplexing and de-multiplexing functions for all the endpoints of an enterprise (e.g., local-area network or domain). When the connection system uses the combination of the bidirectional technique, the stream multiplexing technique, and the endpoint multiplexing technique at each endpoint, the relay server need only allocate one port for each endpoint. One skilled in the art will appreciate that the connection system can use various combinations of the bidirectional, stream multiplexing, and endpoint multiplexing techniques. In particular, the connection system may use any combination of the techniques. For example, the connection system may use the bidirectional technique and the endpoint multiplexing technique, and another connection system may use only the stream multiplexing technique.

In one embodiment, the connection system allows the remote endpoints to request the relay server to allocate ports and to send the identification of the allocated ports to the local endpoints, rather than having the local endpoints request the relay server to allocate the ports. To prevent the local endpoints from having their requests received by the relay server, a firewall may be positioned between the relay server and the local endpoints. The firewall allows access to the allocatable ports of the relay server, but not to the well known port. Since the remote endpoints only need access to the well known port, a firewall between the relay server and the remote endpoints allows access only to the well known port. Thus, the relay server has a firewall to control access by the local endpoints and another firewall to control access by the remote endpoint. In this configuration of the connection system, the relay server is within the de-militarized zone ("DMZ"). With this configuration, the connection system need only expose one port of the relay server through the firewall to the Internet to allow access by any number of remote endpoints.

Figure 3:
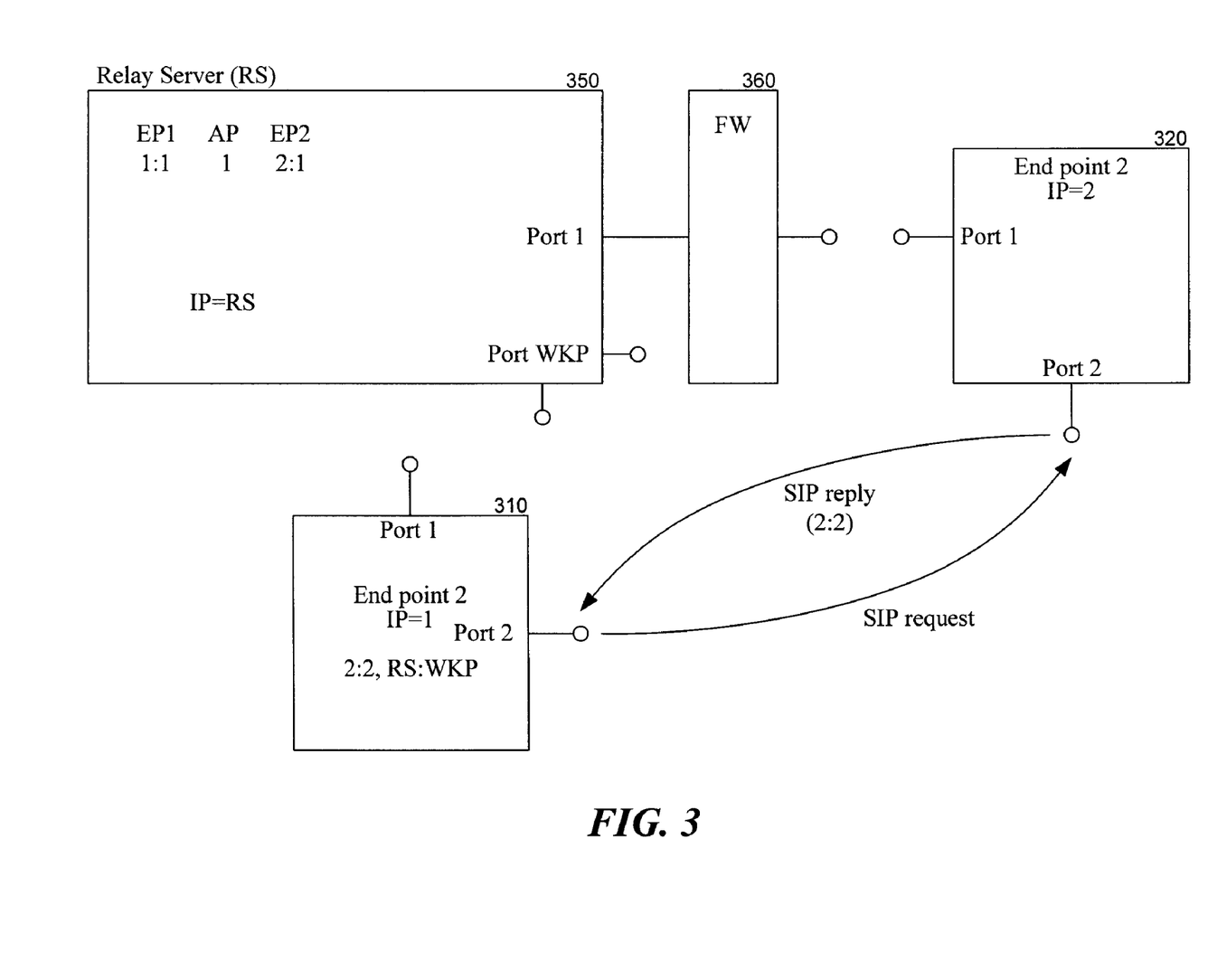
FIG. 3 is a block diagram that illustrates the bidirectional technique of the connection system in one embodiment.

FIG. 3 is a block diagram that illustrates the bidirectional technique of the connection system in one embodiment. The connection system establishes a bidirectional connection between endpoint 310 and endpoint 320 via a relay server 350. Endpoint 320 is prevented from requesting the relay server to allocate a port by preventing access to the well-known port of the relay server using a firewall 360. Endpoint 310 establishes a connection with endpoint 320 by initially requesting the relay server to allocate a port. Endpoint 310 then forwards the allocated port number to endpoint 320 using a SIP request. Endpoint 320 can then send communications to endpoint 310 via the allocated port of the relay server, which is accessible through the firewall. When endpoint 310 wants to send a communication to endpoint 320, it identifies the ports through which it may be able to send communications to endpoint 320. In this example, endpoint 310 has received a SIP reply from endpoint 320 (i.e., IP address 2 and port 2) and a communication from the well-known port of the relay server (i.e., IP address SA and port WKP). Endpoint 310 may then attempt to send a communication to IP address 2 and port 2. If, however, IP address 2 and port 2 are inaccessible, for example, because of a NAT associated with endpoint 320, the attempt will fail. Endpoint 310 will then attempt to send the communication via the well-known port of the relay server. Upon receiving the communication, the relay server will forward the communication to endpoint 320 (i.e., IP address 2 and port 1) as indicated by the mapping. If IP address 2 and port 2 were not protected by a NAT, then the first attempt to send a communication would have been successful and sending the communication via the relay server could be avoided. If endpoint 310 and endpoint 320 were on the same local area network, then their communications could be between ports internal to the network, rather than through the relay server—although the relay server may still have allocated a port. The connection system may order the testing of ports in the following order: internal ports of the endpoints, ports allocated by the relay server, and well-known ports of the relay server.

Figure 4:
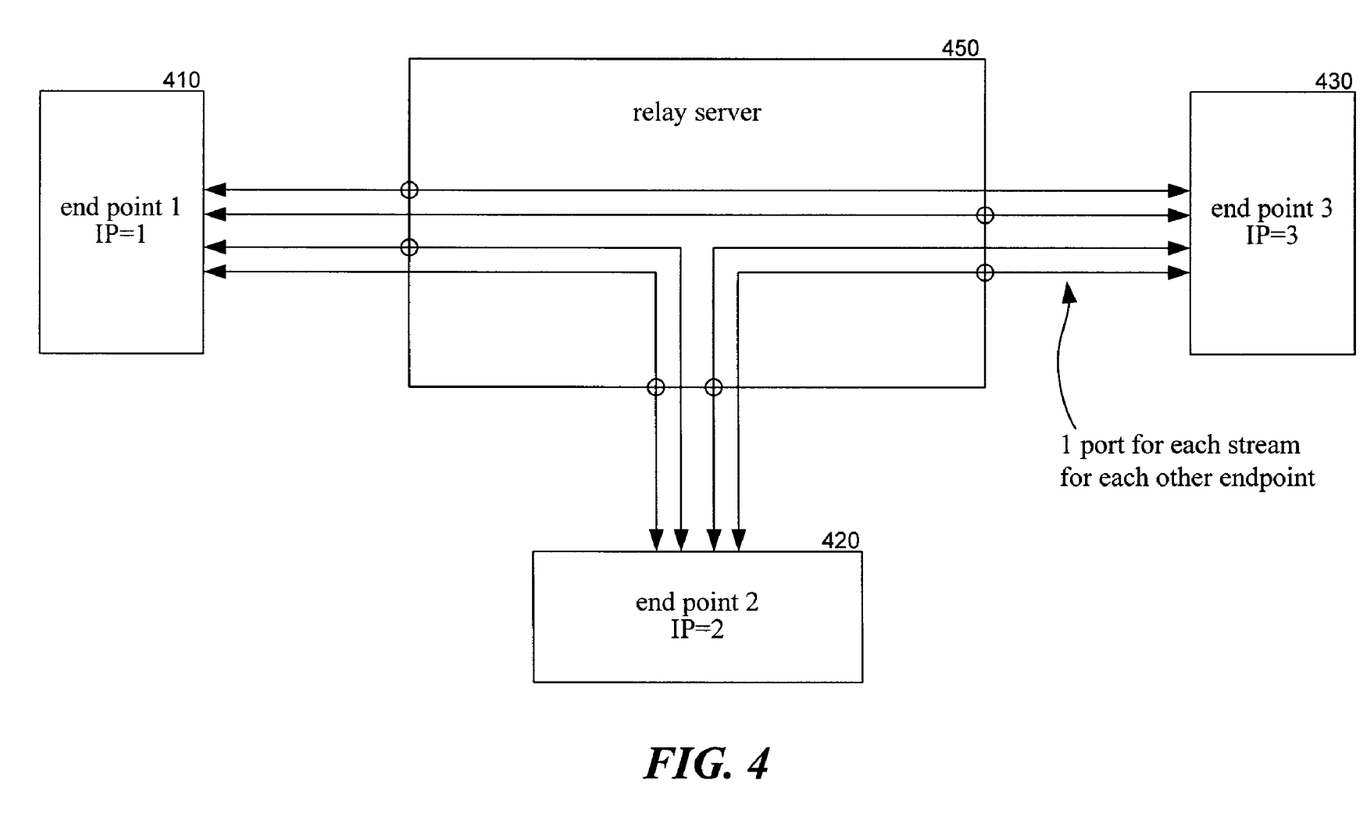
FIG. 4 illustrates the allocation of ports for a multiparty conference using the bidirectional technique in one embodiment.

FIG. 4 illustrates the allocation of ports for a multiparty conference using the bidirectional technique in one embodiment. Endpoints 410, 420, and 430 are connected in a conference via relay server 450. In this example, the relay server has allocated for each endpoint one port (indicated by a circle) for each communication stream for each other endpoint. The conference includes a video stream and an audio stream that are sent from each endpoint. The connection system establishes two bidirectional connections between each pair of endpoints and the relay server allocates two ports for each endpoint. Thus, the relay server allocates only half the number of ports when using the bidirectional technique compared to the conventional unidirectional technique.

Figure 5:
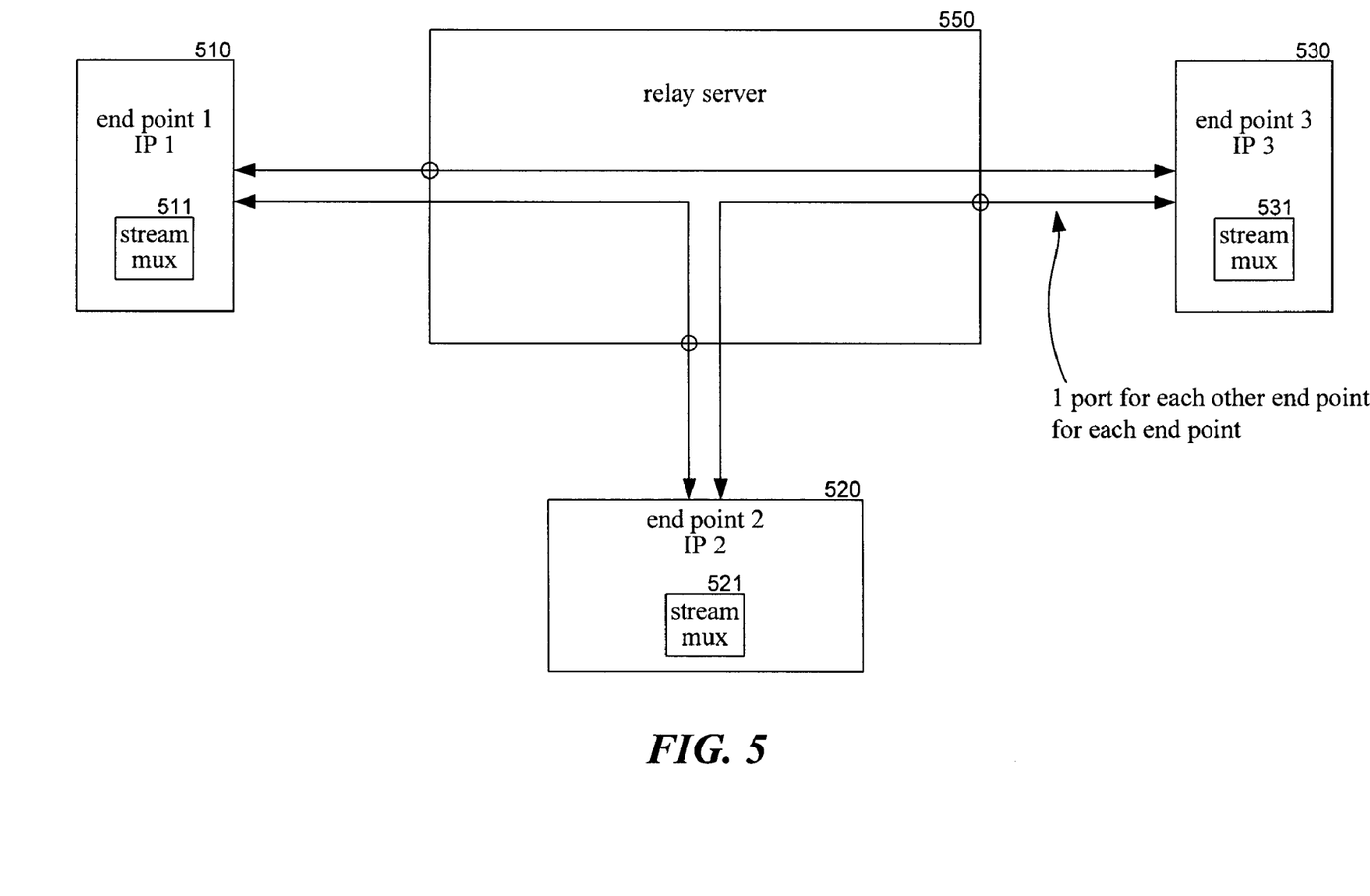
FIG. 5 is a block diagram that illustrates the stream multiplexing technique of the connection system in one embodiment.
Figure 6:
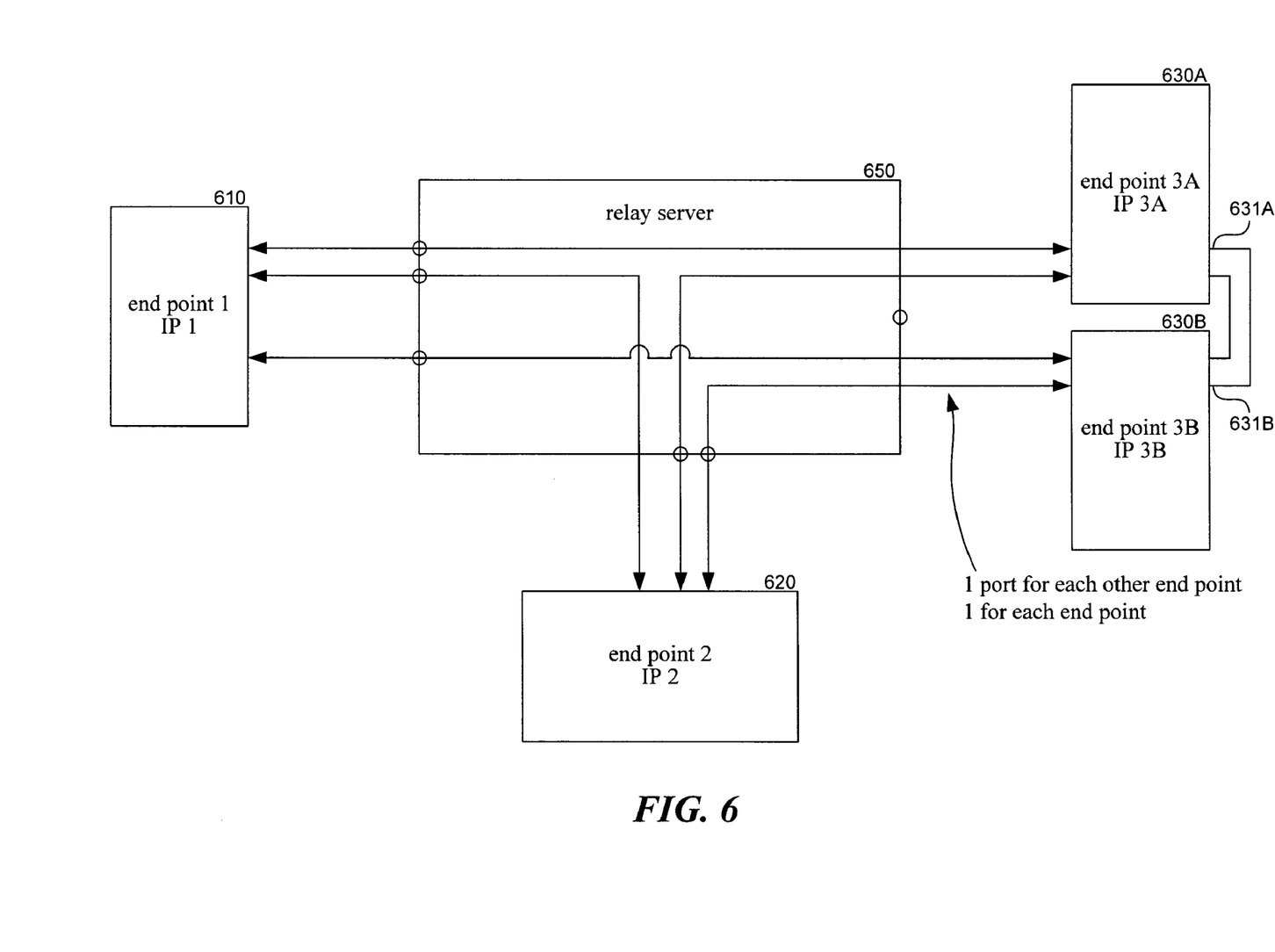
FIG. 6 is a block diagram that illustrates the combination of the bidirectional technique and the stream multiplexing technique of the connection system in one embodiment.

FIG. 5 is a block diagram that illustrates the stream multiplexing technique of the connection system in one embodiment. In this embodiment, the stream multiplexing technique is used in combination with the bidirectional technique. Endpoints 510, 520, and 530 are connected in a conference via relay server 550. Each endpoint includes a stream multiplexing component 511, 521, or 531 that multiplexes multiple streams onto a single connection and de-multiplexes multiple streams received on that connection. In one embodiment, the stream multiplexing component uses the SSRC identifier to identify communications of a stream. When the stream multiplexing technique is used by itself, the connection system allocates only one port in each direction for each endpoint. If, however, the stream multiplexing technique is used in combination with the bidirectional technique, then the relay server allocates only one port for each bidirectional connection. Thus, the relay server would allocate three ports for a three-way conference and six ports for a four-way conference FIG. 6 is a block diagram that illustrates the combination of the bidirectional technique and the stream multiplexing technique of the connection system in one embodiment. In this embodiment, endpoints 610, 620, and 630A and 630B are connected in a conference via a relay server 650. Endpoint 630A and endpoint 630B are connected via a local area network. When endpoint 630A requests the relay server to allocate a port for the connection with endpoint 630B, the relay server allocates the port and endpoint 630A sends the allocated port number to endpoint 630B via a SIP message. Endpoints 630A and 630B will, however, detect that they can communicate via their internal ports 631A and 631B without having to traverse the relay server. Moreover, endpoint 630A may detect that endpoint 630B is local even before it requests the relay server to allocate a port and thus can avoid requesting that a port be allocated.

Figure 7A:
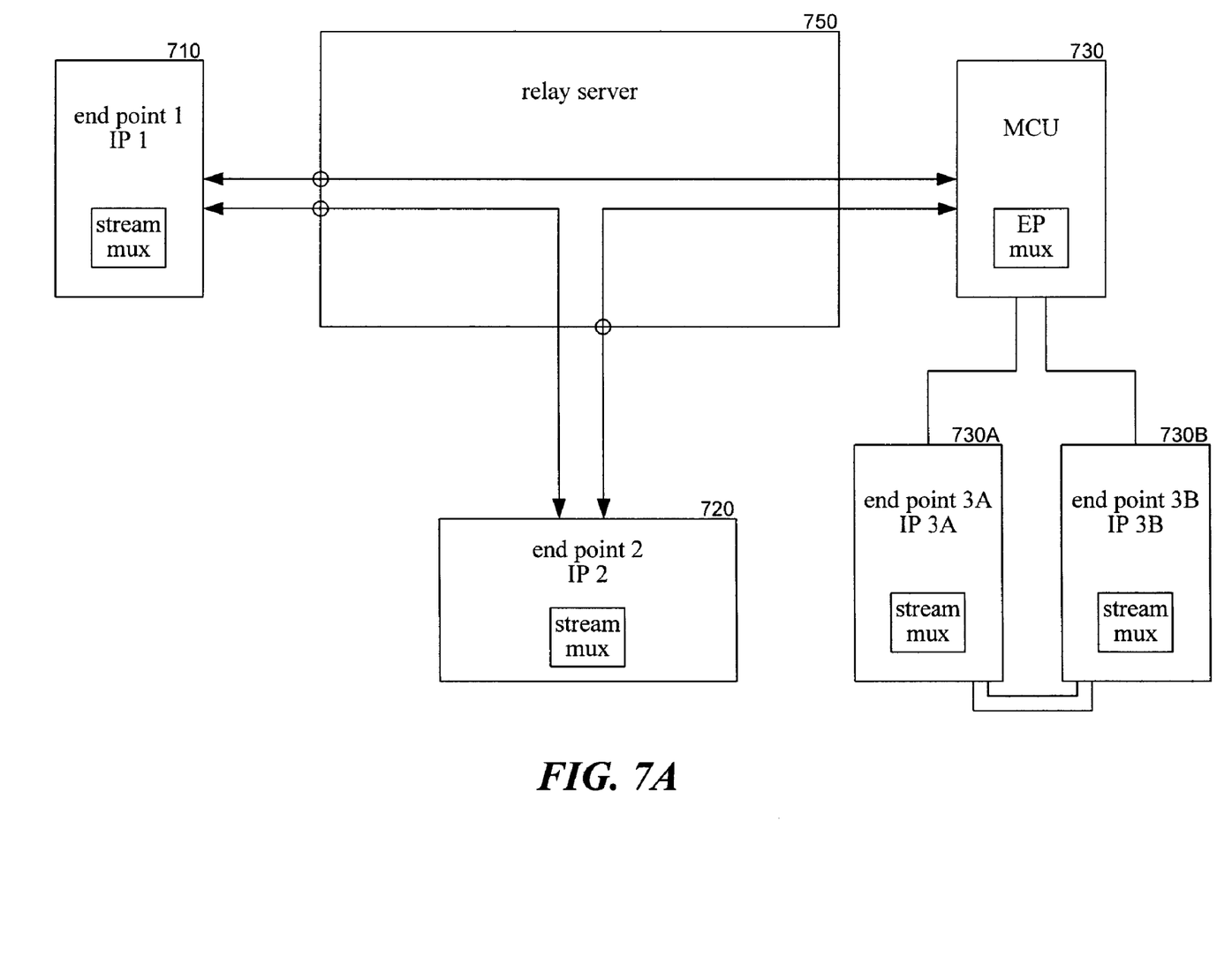
FIG. 7A is a block diagram that illustrates the combination of the bidirectional technique, the stream multiplexing technique, and the endpoint multiplexing technique of the connection system in one embodiment.

FIG. 7A is a block diagram that illustrates the combination of the bidirectional technique, the stream multiplexing technique, and the endpoint multiplexing technique of the connection system in one embodiment. In this embodiment, remote endpoints 710 and 720 and local endpoints 730A and 730B are connected in a conference via a relay server 750. Endpoints 730A and 730B are connected via a local area network and are connected to the relay server via a multipoint conference unit 730. Endpoint 730A may initiate the conference by sending a request to the multipoint control unit that identifies the endpoints to be included in the conference. The multipoint control unit then requests that the relay server allocate ports for endpoints 710 and 720. The multipoint control unit then forwards an indication of that allocated ports to endpoints 710 and 720. Endpoints 710 and 720 participate in the conference by sending communications via their allocated port. The relay server forwards each communication received from a remote endpoint to its allocated port to the multipoint control unit. When the multipoint control unit receives a communication from a remote endpoint, it de-multiplexes the communication and forwards it to endpoints 730A or 730B. The multipoint control unit may use the SSRC identifier to de-multiplex the communications. Each endpoint may also use the SSRC identifier to perform stream de-multiplexing. In this configuration, the connection system does not need to allocate a separate port for each remote endpoint for each local endpoint, rather it need only allocate one port for each remote endpoint for the multipoint control unit.

Figure 7B:
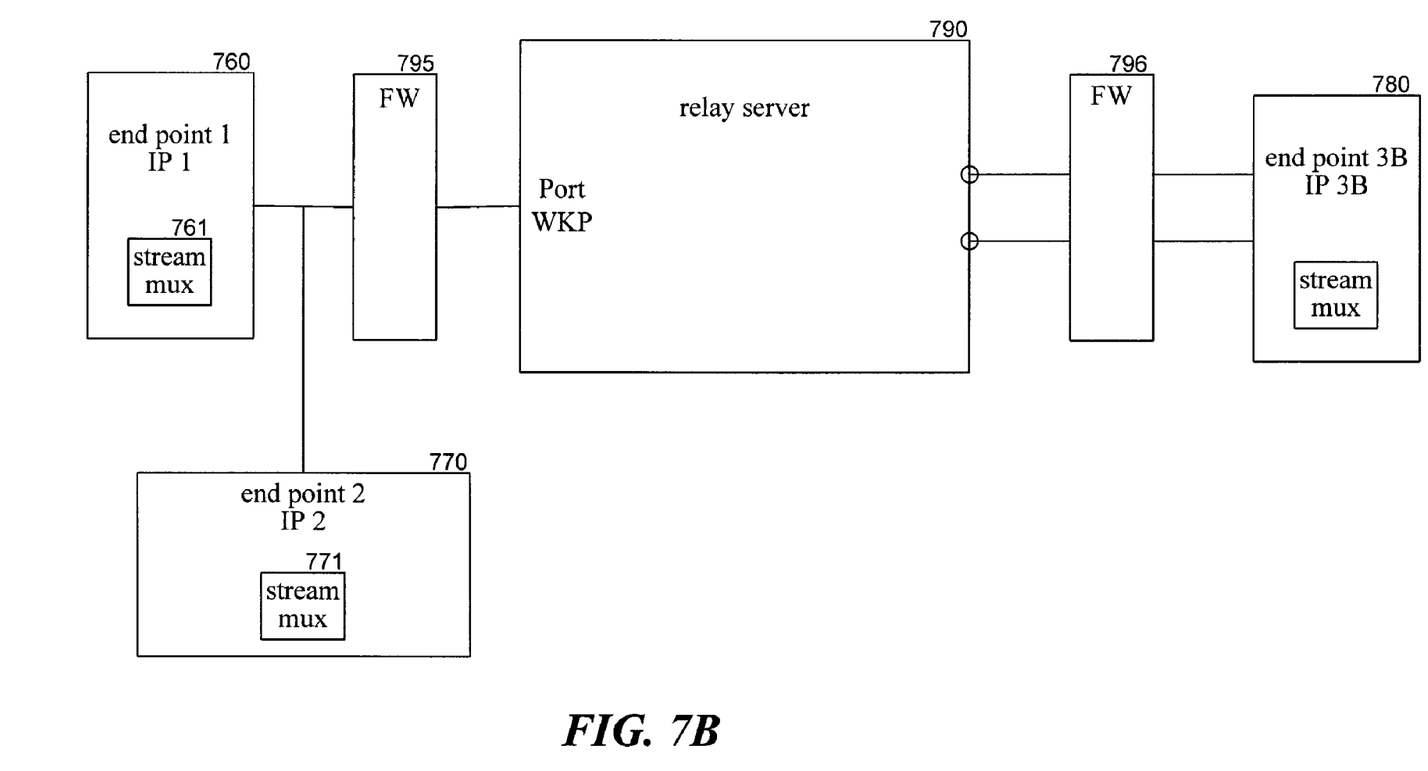
FIG. 7B is a block diagram that illustrates the allocation of ports as requested by the remote endpoints in one embodiment.

FIG. 7B is a block diagram that illustrates the allocation of ports as requested by the remote endpoints in one embodiment. Remote endpoints 760 and 770 and local endpoint 780 are connected in a conference via relay server 790. The relay server is in a de-militarized zone ("DMZ") between firewalls 795 and 796. Firewall 795 need only expose the well known port of the relay server to the remote endpoints. Firewall 796 exposes the allocatable ports of the relay server and does not expose the well known port of the relay server to the local endpoint. A remote endpoint initiates a conference by requesting the relay server to allocate a port and then sending an indication of the allocated port to the local endpoint. When the local endpoint sends a request to the relay server to allocate a port, firewall 796 blocks the request so no port is allocated. The remote endpoints transmit their communications via the well known port, and the local endpoints transmit their communications via the allocated ports.

The computing devices on which the connection system is implemented may include a central processing unit, memory, input devices (e.g., keyboard and pointing devices), output devices (e.g., display devices), and storage devices (e.g., disk drives). The memory and storage devices are computer-readable media that may contain instructions that implement the connection system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the connection system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The connection system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 8:
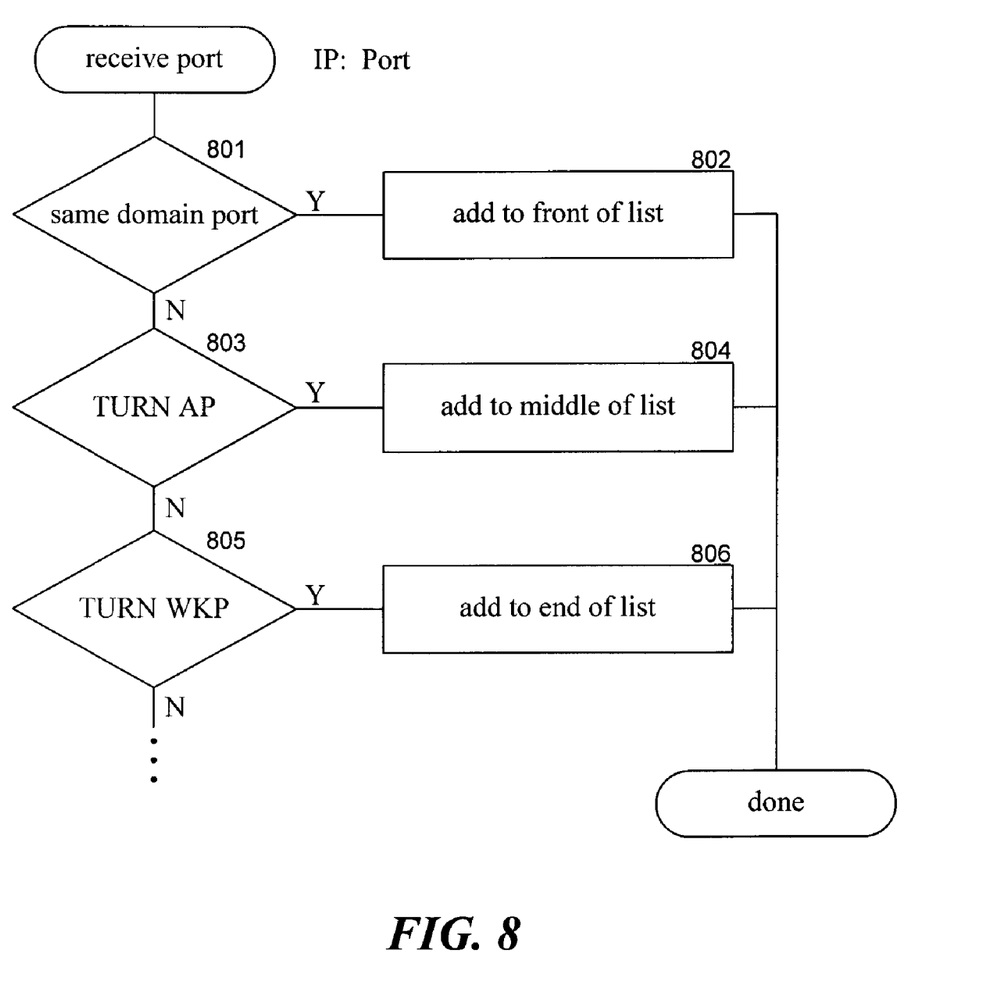
FIG. 8 is a flow diagram that illustrates a component of the connection system that tracks ports through which communications from other endpoints are received in one embodiment.

FIG. 8 is a flow diagram that illustrates a component of the connection system that tracks ports through which communications from other endpoints are received in one embodiment. The component is invoked when a communication is received and passed an indication of the source of the communication and the IP address and port number from which the communication was received. The component maintains each source identifier to a list of IP addresses and port numbers that may be used to communicate with the source. The list is ordered according to the preferred way to communicate with the source. In decision block 801, if the IP address indicates that the source endpoint is in the same domain as this endpoint, then the component continues at block 802 to add the IP address and port number to the beginning of the list, else the component continues at block 803. In decision block 803, if the IP address and port number indicate that the port is an allocated port of the relay server, then the component continues at block 804 to add the IP address and port number to the middle of the list, else the component continues at block 805. In decision block 805, if the IP address and port number indicate that the port is a well-known port of the relay server, then the component adds the IP address and port number to the end of the list. The component then completes. The ordering of the IP addresses and port numbers effectively prefers ports within the same domain followed by allocated ports of the relay server followed by well-known ports of the relay server.

Figure 9:
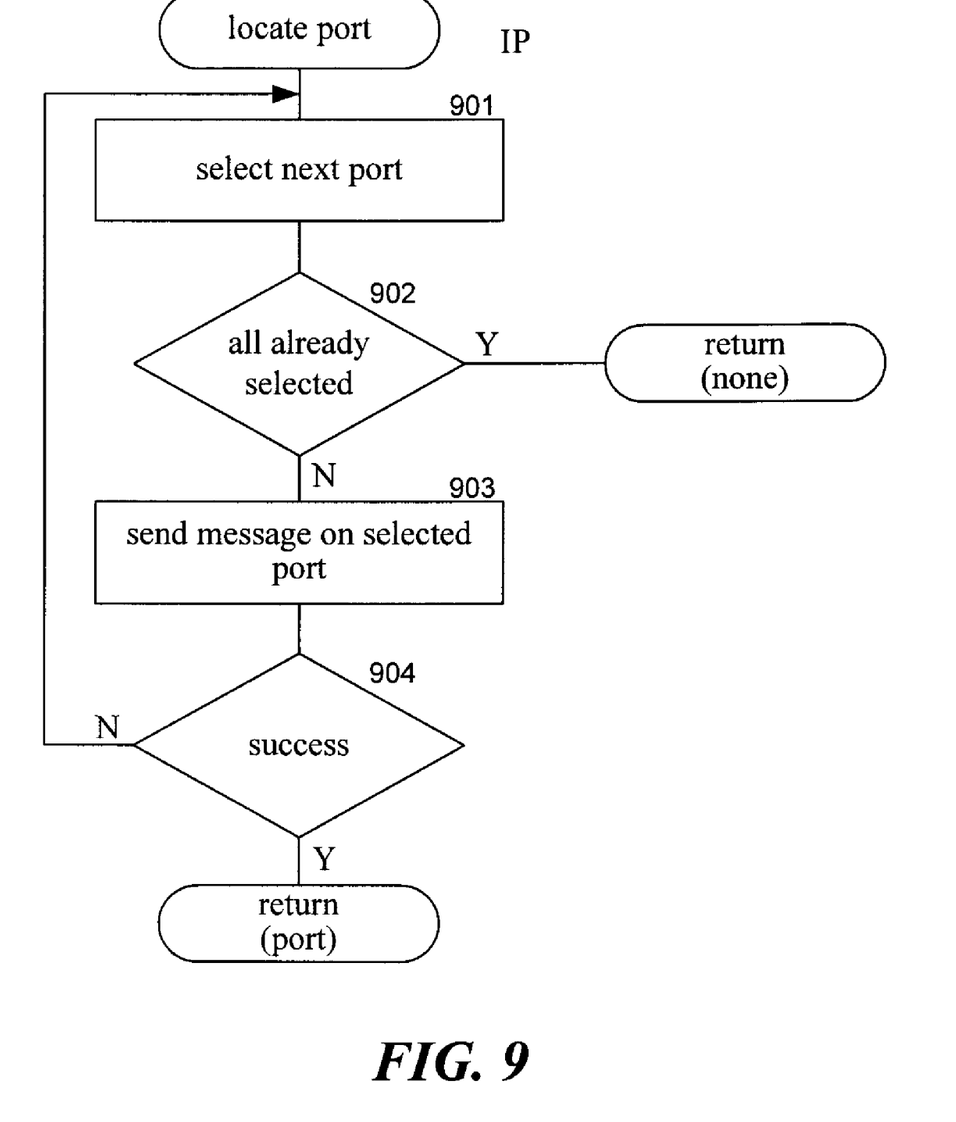
FIG. 9 is a flow diagram that illustrates a component of the connection system that locates a port for communicating with an endpoint in one embodiment.

FIG. 9 is a flow diagram that illustrates a component of the connection system that locates a port for communicating with an endpoint in one embodiment. The component is passed an indication of an endpoint. The component then tries to communicate through each IP address and port number in the list for that endpoint, stopping when a communication is successful. In block 901, the component selects the next entry of the list for the passed endpoint. In decision block 902, if all the entries have already been selected, then the component returns an indication that the endpoint is not accessible via any known port, else the component continues at block 903. In block 903, the component sends a message to the IP address and port number of the selected entry. In decision block 904, if the communication was sent successfully, then the component returns the IP address and port number, else the component loops to block 901 to select the next entry of the list.

From the foregoing, it will be appreciated that specific embodiments of the connection system have been described herein for purposes of illustration, but that various modifications may be made without deviating from the spirit and scope of the invention. One skilled in the art will appreciate that the functions of the endpoint multiplexing technique may be implemented on the relay server rather than on a separate multipoint control unit or other application-level relay. Accordingly, the invention is not limited except as by the appended claims.

We claim:

1. A method for reducing the number of ports allocated by a relay server, the method comprising:

sending from a first endpoint to a known port of the relay server a request to allocate a first allocated port;

receiving at the first endpoint from the relay server an indication of the first allocated port; sending from the first endpoint to the second endpoint an indication of the first allocated port so that the second endpoint can send messages to the first endpoint through the first allocated port of the relay server;

sending from the second endpoint to a known port of the relay server a request to allocate a second allocated port; and when the first endpoint does not receive an indication of the second allocated port, sending messages from the first endpoint to the second endpoint via a known port of the relay server so that the first allocated port and the known port of the relay server are used as a bidirectional connection between the first endpoint and the second endpoint, wherein the relay server is a TURN server and wherein the second endpoint sends messages of different streams to the first endpoint by multiplexing the messages onto the bidirectional connection.

2. The method of claim 1 wherein the first endpoint and the second endpoint send requests to the same known port of the relay server.

3. The method of claim 1 wherein the first endpoint does not receive an indication of the second allocated port because the relay server did not allocate the second allocated port.

4. The method of claim 3 wherein the request sent from the second endpoint to the relay server to allocate a second allocated port is blocked from the relay server by a security system.

5. The method of claim 1 wherein a stream is identified by a synchronization source identifier.

6. The method of claim 5 wherein the first endpoint de-multiplexes the messages sent via the bidirectional connection using the synchronization source identifier.

7. The method of claim 1 wherein when a network has multiple endpoints that communicate via a relay server with the second endpoint, sharing the first allocated port among the multiple endpoints so that the second endpoint sends communications to each of the multiple endpoints via the first allocated port.

8. The method of claim 7 wherein the multiple endpoints are connected to the relay server via a component that performs de-multiplexing of communications sent from the second endpoint via the relay server to the multiple endpoints.

9. A method for reducing the number of ports allocated by a relay server to support communications between a first endpoint and a second endpoint, the method comprising:

receiving at the second endpoint an indication of an allocated port of the relay server;

providing at the second endpoint multiple communication streams, each communication stream having a source identifier; and transmitting from the second endpoint the multiple communication streams to the first endpoint via the allocated port, wherein the relay server is a TURN server, wherein the second endpoint sends messages of different communication streams to the first endpoint by multiplexing the messages onto a bidirectional connection that includes the allocated port of the relay server, and wherein the first endpoint uses the source identifier of a communication stream to de-multiplex the communication stream sent via the allocated port.

10. The method of claim 9 wherein the indication of the allocated port is received from the first endpoint.

11. The method of claim 10 wherein the second endpoint attempts unsuccessfully to have a port allocated by the relay server for use by the first endpoint in sending communications to the second endpoint.

12. The method of claim 11 wherein the attempt is unsuccessful because a request sent from the second endpoint to the relay server to allocate a port is blocked from the relay server by a security system.

13. A communication system for providing connections between a plurality of first endpoints and a second endpoint, comprising:

a relay server that provides a known port for receiving communications and that allocates a port when requested; and a de-multiplexing component that connects to each of the first endpoints, that requests the relay server to allocate a port, that provides an indication of the allocated port to the second endpoint, that receives communications from the first endpoints to the second endpoint via the connections and forwards the communications to the relay server, and that receives communications from the second endpoint sent to the relay server via the allocated port to various first endpoints and provides the communications to the intended first endpoints, wherein the relay server is a TURN server and wherein the second endpoint sends messages of different streams to first endpoints by multiplexing the communications of the different streams onto a bidirectional connection formed by the known port and the allocate port of the relay server.

14. The communication system of claim 13 wherein the second endpoint sends multiple communication streams via the allocated port to a first endpoint.

15. The communication system of claim 14 wherein the first endpoint upon receiving the multiple communication streams de-multiplexes the communication streams.

16. A communication system for providing connections between endpoints, comprising:

a relay server that provides a known port for receiving communications and that allocates a port when requested;
a first firewall allowing access to the known port of the relay server, but not allowing access to the ports to be allocated; and
a second firewall allowing access to the ports to be allocated of the relay server, but not allowing access to the known port so that a first endpoint can access the known port to initiate a conference with a second endpoint that can access a port to be allocated,
wherein the relay server is a TURN server and
wherein the first endpoint sends messages of different streams to the second endpoint by multiplexing the messages onto the bidirectional connection formed by the known port and the allocated port of the relay server.

* * * * *